United States Patent [19]
Von Berg

[11] Patent Number: 5,794,608
[45] Date of Patent: Aug. 18, 1998

[54] BARBECUE STAND

[75] Inventor: Thomas Von Berg, Knoxville, Tenn.

[73] Assignee: MECO Corporation, Greeneville, Tenn.

[21] Appl. No.: 730,357

[22] Filed: Oct. 15, 1996

Related U.S. Application Data

[60] Provisional application No. 60/005,433 Oct. 13, 1995.

[51] Int. Cl.[6] .................................. A47J 37/00; F24C 15/08
[52] U.S. Cl. ......................... 126/25 R; 126/305; 248/188.7
[58] Field of Search ............................... 126/29, 30, 25 R, 126/9 R, 41 R, 50, 304 R, 304 A, 305, 306; 248/129, 188.7; 108/150

[56] References Cited

U.S. PATENT DOCUMENTS

| | | | |
|---|---|---|---|
| 2,094,915 | 10/1937 | Dawson | 126/29 |
| 2,537,670 | 11/1951 | Dionne | 248/188.7 |
| 3,005,611 | 10/1961 | Terry | 126/304 R |
| 3,164,347 | 1/1965 | McMasters | 108/150 |
| 3,200,806 | 8/1965 | Goldstein | 126/25 |
| 3,251,355 | 5/1966 | Keating | 126/41 R |
| 3,380,696 | 4/1968 | Pauly et al. | 248/188.7 |
| 3,421,433 | 1/1969 | Vitale | 99/340 |
| 3,452,739 | 7/1969 | Harff et al. | 126/25 |
| 3,593,701 | 7/1971 | Youmans | 126/25 A |
| 3,611,915 | 10/1971 | Glasser et al. | 99/445 |
| 3,785,275 | 1/1974 | Keats et al. | 99/446 |
| 3,878,829 | 4/1975 | Schantz | 126/41 |
| 4,724,753 | 2/1988 | Neyman et al. | 99/339 |
| 4,728,065 | 3/1988 | Coote | 248/129 |
| 4,836,480 | 6/1989 | Besner | 126/30 |

*Primary Examiner*—James C. Yeung
*Attorney, Agent, or Firm*—Roberts & Brownell, LLC

[57] ABSTRACT

A barbecue assembly includes a barbecue unit supported by a barbecue stand. The barbecue stand has a main vertical support. A plurality of support members are provided at the top of the main vertical support, and serve to support the barbecue unit on top of the stand. A plurality of legs are connected to and extend out laterally from a lower portion of the main vertical support. Wheels are provided on some of the legs for moving the barbecue assembly from one location to another. The stand is configured and positioned in relation to the barbecue unit so that the overall unit can be easily wheeled around, is less susceptible to being tipped over, and does not take up too much floor space.

20 Claims, 4 Drawing Sheets

BARBECUE STAND

RELATED APPLICATION DATA

The present disclosure is a non-provisional application related to the provisional U.S. Patent Application entitled "Barbecue Stand", Serial No. 60/005,433, filed Oct. 13, 1995.

FIELD OF THE INVENTION

The present invention is directed to a barbecue assembly including a barbecue unit and a stand supporting the barbecue unit. More particularly, the present invention relates to a stand for supporting a barbecue unit which is simple in its construction and includes wheels for moving the barbecue assembly from one location to another.

BACKGROUND AND DESCRIPTION OF RELATED ART

Barbecue assemblies have long been used in backyard settings, picnics, cookouts, family gatherings, and a host of other social gatherings. Unfortunately, many current barbeque assemblies pose inconveniences to their users, including poor access to storage space, and difficulty in assembling, maintaining, storing, and repositioning the barbeque assembly.

As way of example, barbecue frames are usually constructed from metal tubes or poles and usually feature legs for support. These frames are available in many styles, from monopole designs to four-legged designs. Specifically, monopole designs—which have been known in the art for several decades—are based on a single pole which branches from the underside of the barbecue grill. These systems typically do not have means for transporting the barbecue or, equally as important, do not provide adequate storage space for food, utensils, charcoal, etc. These monopole barbecue systems are not very stable or durable.

U.S. Pat. No. 4,724,753 to Neyman et al. discloses a barbecue apparatus having a vertical central post and a removably attached base. The post has several holes staggered both vertically and radially thereabout. The base has a collar that is slidably mounted to the vertical post and has legs extending radially about. A cooking grill is slidably mounted on the post. Only one support leg is disclosed in this patent.

U.S. Pat. No. 3,878,829 to Schantz discloses a barbecue post having split half tubular posts that are bolted together. The front half post forms a half of a tube that is connected to a back half which forms the split tubular post. The halves are secured by a nut and bolt assembly. The split post facilitates the assembly of gas lines to the barbecue unit. The barbecue unit is swivel mounted to the split post. Only one support leg is disclosed in this patent.

An additional monopole design includes U.S. Pat. No. 3,593,701 to Bertram L. Youmans whereby a collapsible barbecue grill having a central post and legs is disclosed. The center post has an upper and a lower section. The lower section telescopes into the upper section and is adjustable by a pin and notch mechanism, thereby allowing the height of the system to be altered. The lower portion has a stationary ring that serves to support the grill which is radially disposed about the center post. The legs are made from a single wire or rod and are bent to provide diagonally extending legs. The legs cross at the apex and are bent into a loop. The loop is positioned in the lower tube section and engages the wall thereof.

Other barbecue structures include tripod designs such as U.S. Pat. No. 3,785,275 to Keats et al. which discloses a barbecue cooker comprising a fire bowl, a gas burner, and a tripod support stand. The tripod support comprises legs which are spaced apart so that a cylindrical gas burner unit can be disposed therein. This patent teaches away from a unitary center post since a gas burner unit must be placed between the legs.

Another tripod design is U.S. Pat. No. 3,611,915 to Glasser et al., wherein a barbecue cooker and support structure comprising three legs having an upper, central and lower portion, and a dome shaped hood and fire bowl is disclosed. The hood is hinged to the fire bowl by a swing arm mechanism mounted to a screw and bushing assembly. The upper portion of the legs is mounted to the lower portion of the fire bowl by a bolt and spacer assembly. The central portions of the legs are interconnected to one another by a stabilizing bracket disposed between the space of the legs. The legs diverge outward below the stabilizing bracket. At the lower portion of two legs are wheels, whereas the lower portion of the third leg is adapted to engage the ground.

As referenced in U.S. Pat. No. 3,785,275 to Keats et al. the legs of the support structure appear to be attached and disposed downward about the center of the fire bowl—not offset toward the back of the barbecue. There is no suggestion that the legs should be disposed about each other forming a unitary central post or that two feet (of the legs) be disposed in a horizontal relation to one another.

U.S. Pat. No. 3,452,736 to G. Harff et al. discloses a portable barbecue grill having a three leg support structure and a barbecue grill unit attached thereto. The three legs are U-shaped and are intersecured by two vertically spaced upper and lower hinge members. The legs are interspaced and are disposed about the center of the barbecue unit. There is no suggestion that the legs should be interconnected to form a unitary central post or be offset towards the back of the barbecue unit. At the upper ends of the legs are barbecue holding members that penetrate holes in the barbecue unit and are secured thereto by end projections integrally attached to the holding members. The end projections form a loop which supports an inner food grill.

U.S. Pat. No. 3,200,806 to A. Goldstein discloses a folding barbecue construction having a grill element and a tripod support element. Attached to the underside of the grill element are two ear mounts which pivotally connect two of the legs. The legs have inwardly and downwardly extending first portions and fold portions. The legs come in closest contact at the fold portions. Following the fold portions are downwardly and outwardly extending second portions. Pivotally secured to the two legs (at a "pintle") is a support leg which is generally straight. At the center of the support leg are two opposing projections. Mounted on the second portions of the ear mounted legs is a spring plate having a truncated triangular shape. The plate is secured to the legs by rivets at one end and has laterally extending ears at the other end defined by slots. The slots communicate with the projections of the support arm when the barbecue is in an erect position.

U.S. Pat. No. 3,421,433 to C. Vitale discloses a portable cooking grill comprising a hollow rectangular fire-box body and a support frame. The fire-box body has an open front with a removable screen member and several shelves therein for holding fuel. The fire-box is pivotally mounted to side legs. The legs are tied together by a tie bar to ensure stability of the unit. There is no central post or wheels.

U.S. Pat. No. 2,094,915 to C. E. Dawson discloses a broiler mounted on a table top with supporting legs. The broiler is an inverted conical fire pot removably mounted in a central opening of a round table. On top of the fire pot are a grill and upright members on which a spit is mounted. On the underside of the round table are curved legs. The portion midway between the end of the curved legs is a center drum for ashes. The curved legs appear to be disposed about the center of the table and, thus, are not offset toward the back of the unit. There is also no suggestion of wheels or legs forming a unitary central post.

There is a need for a barbecue assembly which includes a barbecue grill placed on top of a supporting stand that is strong, durable, and easy to use. The stand should allow items to be placed along side the stand and should not take up too much floor space. The stand should allow for deployment of the barbecue assembly in a cluttered area immediately adjacent a table upon which food and various utensils may be placed. Preferably, the design should include wheels for easy portability and a handle for ease in maneuvering of the barbecue assembly.

SUMMARY OF THE INVENTION

The present invention, through one or more of its various aspects and embodiments, is thus presented to bring about one or more objects and advantages, such as the following.

An object of present invention is to provide a barbecue assembly including a barbecue grill unit and a stand supporting the barbecue unit, such barbecue assembly being easy to reposition from one location to another during use. More particularly, it is an object of the present invention to provide a barbecue assembly which may be repositioned while standing in front of the barbecue assembly. The weight distribution of the assembly preferably is such that it is easy to lift up and move on wheels located toward the back side of the barbecue assembly. While the person is moving the grill and standing in front of the barbecue assembly, the person's legs and feet preferably will not be hindered or constrained by the barbecue assembly stand.

It is a further object of the present invention to provide a barbecue assembly with a stand that leaves a large amount of free space underneath a barbecue unit being supported by the stand, thereby allowing objects to be placed beneath the barbecue unit and further allowing the barbecue unit to be positioned so it extends over a flat surface such as a table.

Yet another object of the present invention is to provide a barbecue assembly that has a support leg structure that does not interfere with the feet of the user standing near the front of the barbecue assembly. That is, the barbecue assembly preferably has a support leg structure that does not cause the user to bump his/her feet into a support frame, structure, or leg.

Yet another object of the present invention is to provide a barbecue assembly that is easy to assemble because it requires assembly of only a small number of separate parts.

The present invention, therefore, is directed to a barbecue assembly comprising a barbecue unit and a stand supporting the barbecue unit. The stand includes a main vertical support, support means for supporting the barbecue unit on the main vertical support, and a plurality of legs connected to and extending laterally from the main vertical support.

The support means are fixed to a top portion of the main vertical support, and are secured to the barbecue unit. At least two wheels are mounted on certain ones of the of legs, and are arranged in laterally-spaced and substantially vertical planes.

The main vertical support has a central longitudinal axis, which intersects at its top end an underside surface of the barbecue unit, at a position spaced by a predetermined distance from a vertical center axis of the barbecue unit towards the back side of the barbecue unit. The central longitudinal axis intersects at its lower end a support surface upon which the barbeque is rested, at a position spaced further (more than the predetermined distance) from the vertical center axis of the barbecue unit toward the backside of the barbecue unit.

In a particular aspect of the invention, only one of the legs connected to the main vertical support extends forward of the vertical center axis of the barbeque unit. The main vertical support may comprise a plurality of substantially vertically arranged, co-located longitudinal members. In the alternative, the main vertical support may comprise a plurality of substantially vertically arranged longitudinal members continuously abutting each other so as to form a unitary post.

In accordance with a more particular aspect of the invention, the legs connected to and extending laterally from the main vertical support comprise a total of three legs, including one leg extending toward the front of the barbecue assembly and two legs each extending out toward an opposite side of the barbecue assembly. The front leg may be provided with a downward pointing pedal extremity at its distal end.

The support means which supports the barbecue unit on the barbecue stand may comprise a plurality of support arms, each arm being fixed to a lower portion of the barbeque unit. More specifically, each of the support arms may be secured to an underside surface of the barbecue unit.

In accordance with another aspect of the present invention, the barbecue unit comprises a barbecue grill, which may be a charcoal-type barbecue grill. The barbecue grill may include a basin and a hinged cover coupled in a hinged fashion to the basin. The basin contains a substantially horizontally positioned grill and a mechanism for adjusting the position of the grill.

In accordance with a further aspect of the present invention, the support arms which form the support means may comprise a total of three support arms each being substantially aligned with a corresponding one of three legs that extend laterally from the main vertical support.

BRIEF DESCRIPTION OF THE DRAWINGS

The present invention is further described in the detailed description that follows, by reference to a plurality of drawings by way of a non-limiting exemplary embodiment of the present invention, like reference numerals in the drawings representing similar parts throughout the several views of the same, and wherein.

DETAILED DESCRIPTION OF AN EXEMPLARY EMBODIMENT

Figure 1:
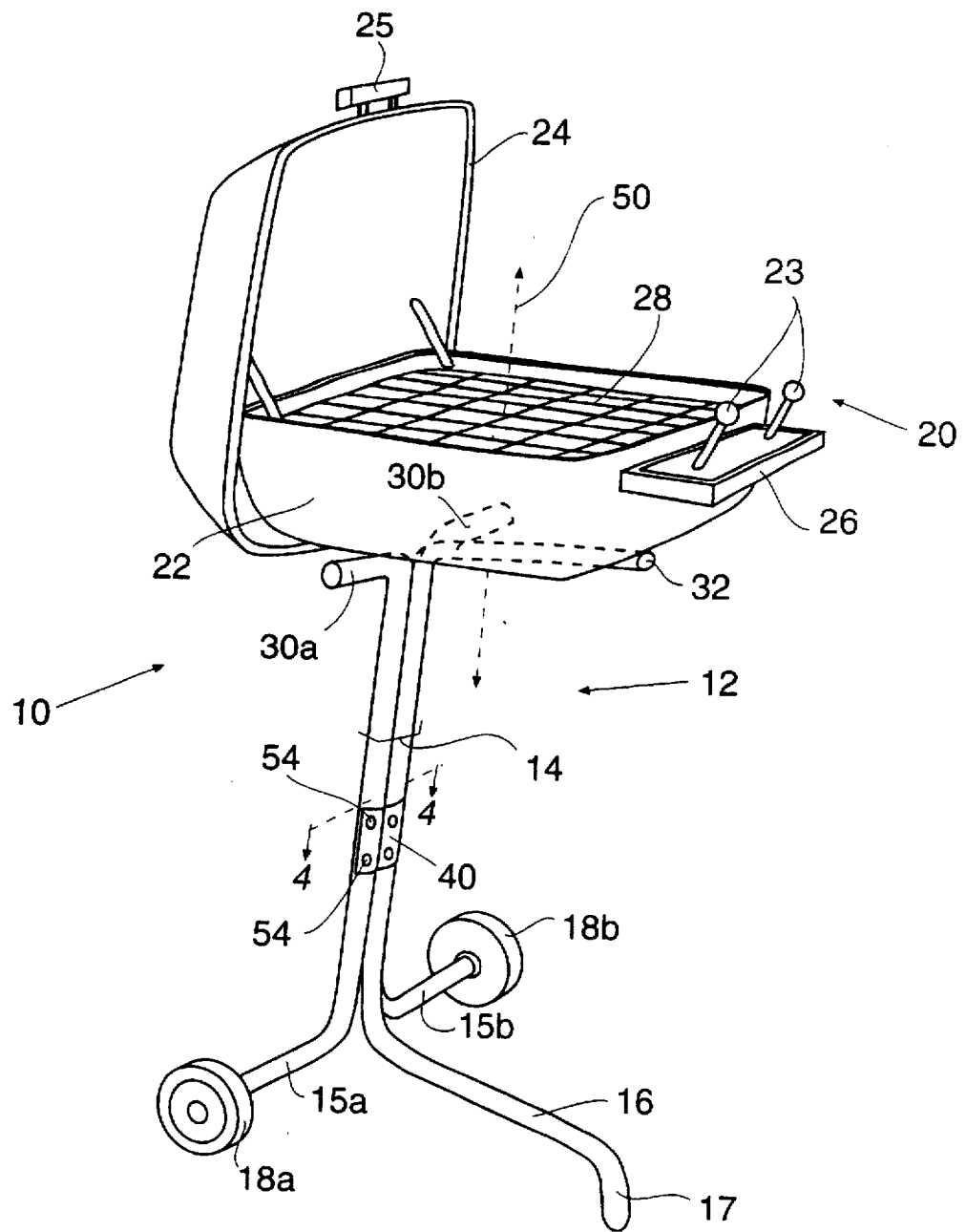
FIG. 1 is a perspective view of a barbecue assembly, including a barbecue unit and a stand supporting the barbecue unit.

Referring now to the drawings in greater detail, FIG. 1 is a perspective view of a barbecue assembly 10, including a barbecue unit 20 and a barbecue stand 12 which supports barbecue unit 20. Barbecue unit 20 includes a basin 22 and a hinged cover 24 coupled in a hinged manner to basin 22 so that it may be easily opened and closed. In FIG. 1, hinged cover 24 is shown in a fully-opened position. Hinged cover 24 has a cover handle 25 secured thereto, and basin 22 comprises a positioning handle 26 located on a front surface of basin 22. Barbecue unit 20 further comprises a substantially horizontally positioned grill 28 which includes a mechanism (not shown) for repositioning grill 28. Barbecue 20 further comprises a plurality of grill-positioning levers 23 which interact with the repositioning mechanism (not shown) of grill 28 to reposition grill 28 to a desired position appropriate for cooking various types of foods.

Barbecue unit 20 is securely supported by barbecue stand 12 which includes a main vertical support 14, a plurality of legs connected to and extending laterally from main vertical support 14, and at least two wheels mounted to certain ones of the legs. In the specific embodiment illustrated in FIG. 1, the legs comprise a total of three legs, including a pair of lateral legs 15a, 15b, and a front leg 16. Lateral legs 15a, 15b extend outwardly and are substantially horizontal. In the illustrated embodiment, lateral legs 15a, 15b comprise a common central longitudinal axis, and each end of lateral legs 15a, 15b comprises a bearing or other type of wheel-mounting mechanism for rotatably receiving each respective wheel 18a, 18b. Front leg 16 extends toward the front of barbecue assembly 10 from a position in the middle of lateral legs 15a, 15b, and is generally horizontally positioned. Front leg 16 has at its distal end a pedal extremity 17 which faces downward and supports barbecue assembly 10 on a support surface and prevents the entire unit from moving.

Barbecue stand 12 further comprises a plurality of support arms 30a, 30b, 32 for supporting the barbecue unit 20 on top of barbecue stand 12. Each of the support arms is fixed to a top portion of main vertical support 14 and is also secured to a lower portion of barbecue unit 20. In the specific embodiment of FIG. 1, the support arms comprise three support arms which correspond generally in number and position to each of the three legs of barbecue stand 12. More specifically, a pair of lateral arms 30a, 30b is provided, each lateral support arm extending out from main vertical support 14 to each respective side of barbecue assembly 10. Lateral support arms 30a, 30b comprise a common central longitudinal axis. A front support arm 32 extends from a top portion of main vertical support 14 toward a front of barbecue assembly 10, and is positioned generally perpendicular to the common longitudinal axis of the lateral support arms 30a, 30b. Each of the support arms may be secured in any appropriate well-known fashion to an underside surface of basin 22 of barbecue unit 20. By way of example, each of the support arms may be fixed to basin 22 with bolts and nuts.

Figure 2:
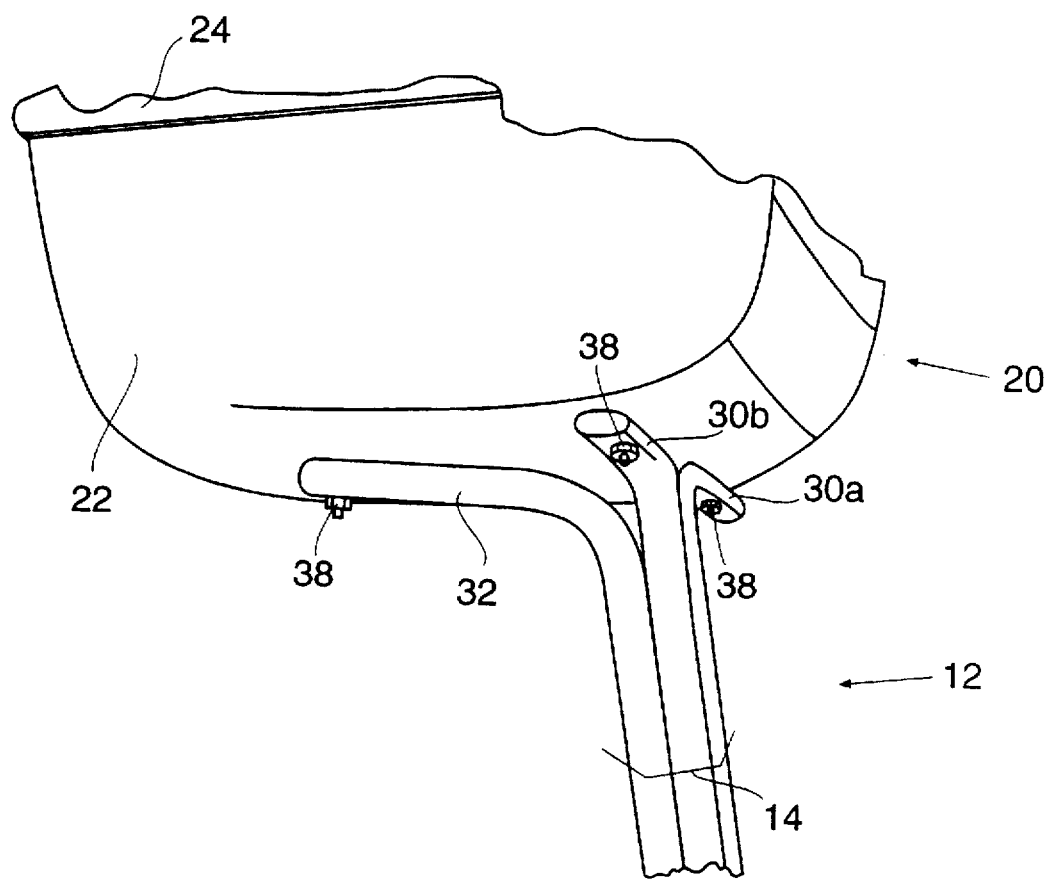
FIG. 2 is a perspective view of a portion of a barbecue assembly at which a top portion of the supporting stand is coupled to a barbecue unit.

FIG. 2 is a perspective view showing the coupling of barbecue unit 20 to the support arms of barbecue stand 12. As shown in FIG. 2, lateral support arms 30a, 30b and front support arm 32 may be fixed to an underside surface of basin 22 with threaded nuts and bolts 38.

Figure 3:
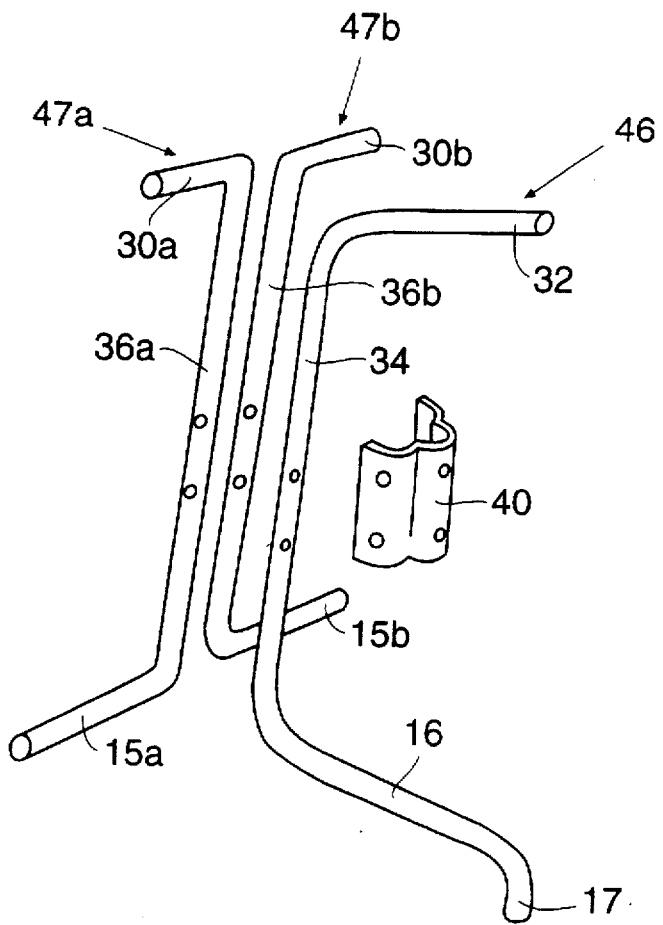
FIG. 3 is a perspective view of a particular embodiment of a main vertical support which forms part of the barbecue stand.

Barbecue stand 12 may be formed by a unitary integral piece of light-weight rigid material, such as metal or plastic; or, in the alternative, barbecue stand 12 may be formed with a plurality of separate pieces. In the embodiment illustrated in FIGS. 1-5, barbecue stand 12 is formed with three separate supporting members. Referring to FIG. 3, the three separate supporting members include a front C-shaped member 46 and a pair of lateral C-shaped members 47a, 47b. Each of the C-shaped members 46, 47a, 47b may be formed with a metal hollow conduit having a cross-sectional shape which would provide the sufficient reinforced strength for use in the context of a barbecue assembly. The cross-sectional shape of the conduit may be, e.g., oval, circular, square, or rectangular. In the alternative, each of the separate C-shaped members 46, 47a, 47b may be formed with solid bars.

Front C-shaped member 46 includes a top portion comprising a substantially horizontal front support arm 32, a middle portion comprising a front vertical member 34, and a bottom portion comprising a generally horizontal front leg 16. Left side lateral C-shaped member 47a includes a top portion comprising a substantially horizontal lateral support arm 30a, a middle portion comprising a lateral vertical member 36a, and a bottom portion comprising a substantially horizontal lateral leg 15a. Similarly, right side lateral C-shaped member 47b comprises a top portion which includes a substantially horizontal lateral support arm 30b, a middle portion which includes a lateral vertical member 36b, and a bottom portion which includes a substantially horizontal lateral leg 15b.

Figure 4:
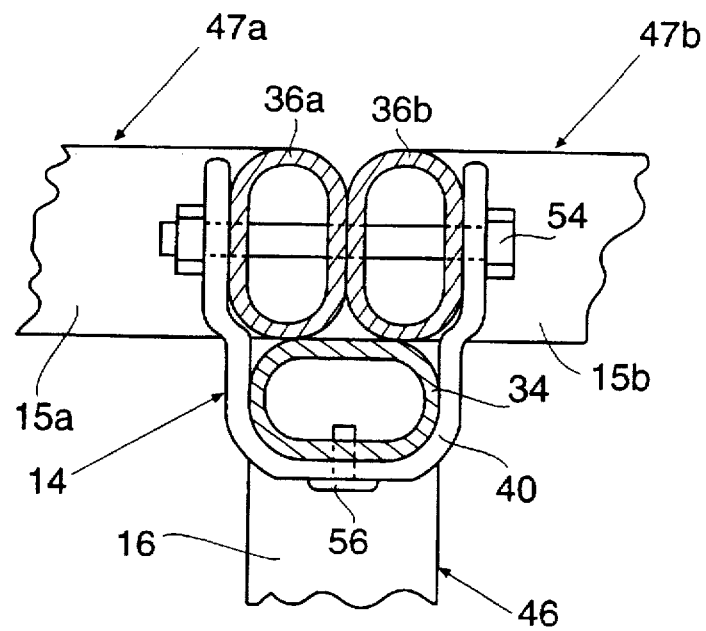
FIG. 4 is a sectional view of a main vertical support and a main support bracket shown in FIG. 1, the view being defined by the viewing plane line 4—4.

Each of front and lateral C-shaped members 46, 47a, and 47b may be positioned so that they are co-located with each other, e.g., located together or near each other. In the specific embodiment illustrated in the figures, the C-shaped members are fixed to each other in a unitary fashion. More specifically, the substantially vertically arranged longitudinal middle portions are continuously abutting each other so as to form a unitary post. In order to fix the longitudinal members to each other, a bracket or other suitable connecting mechanism may be used. In the illustrated embodiment, a bracket 40 is provided, e.g., as illustrated in FIGS. 3 and 4. Each of the separate members which form the barbecue stand, as shown in FIG. 3, may be fixed to each other in any suitable manner so as to provide a rigid and strong main vertical support when in their assembled form. For example, as an alternative, the middle portions of the various C-shaped members may be welded to each other.

FIG. 4 is a sectional view of a bracket 40 used to secure a main vertical support 14 as shown in FIG. 1. The view is defined by the viewing plane line 4—4 which is shown in FIG. 1. Bracket 40 is used to secure C-shaped members 46, 47a, 47b to each other to form a unitary post. Bracket 40 is engaged with the middle portions of each of the C-shaped members, and surrounds at least three sides of the joined C-shaped members as shown in FIG. 4. A plurality of threaded nut-bolt assemblies 54 may be utilized to fix bracket 40 in a position at least partially surrounding front vertical member 34 and abutting lateral vertical members 36a, 36b. Suitable holes should be provided within lateral vertical members 36a, 36b as well as within the sides of bracket 40 to accommodate threaded nut-bolt assemblies 54. In order to further secure the vertical position of front vertical member 34 in relation to main vertical support 14, one or more screws or threaded bolts 56 may be inserted through a hole provided in a front portion of bracket 40 into a threaded bore provided within a front vertical side of front vertical member 34. In the illustrated embodiment, e.g., as shown in FIGS. 1 and 3, two threaded nut-bolt assemblies 54 are provided to secure bracket 40 to the assembled main vertical support, and two threaded screws/nuts 56 are provided to secure the vertical position of front vertical member 34 in relation to bracket 40 and lateral vertical members 36a, 36b.

Figure 5:
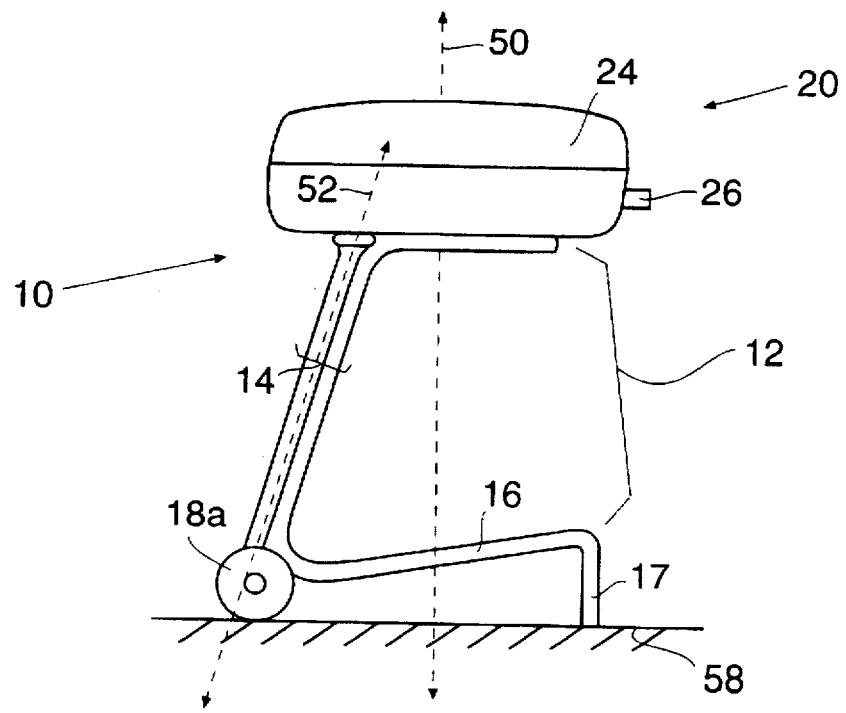
FIG. 5 is an elevated side view of the barbecue assembly of FIG. 1.

FIG. 5 provides an overall side view of the barbecue assembly 10 of FIGS. 1-4. Barbecue unit 20 is shown as having a vertical center axis 50. Main vertical support 14 has a central longitudinal axis 52. Central longitudinal axis 52 intersects at its top end a lower side surface of barbecue unit 20, at a position spaced by a predetermined distance from vertical center axis 50 of barbeque unit 20, toward the back side of barbecue unit 20. Central longitudinal axis 52 intersects at its lower end a support surface 58 upon which the barbeque assembly 10 is rested, at a position spaced more than the predetermined distance from vertical center axis 50 of barbecue unit 20, toward the back side of barbecue 20. Accordingly, main vertical support 14 of barbecue stand 12 is at an angle with respect to the support surface 58 upon which barbecue assembly 10 is rested, so that the bottom end of main vertical support 14 is located more toward the back of barbecue unit 20 than its top end which is connected to barbecue unit 20.

In addition, in the illustrated embodiment, as shown FIG. 5, front leg 16 extends toward the front of barbecue assembly 10 from main vertical support 14. As it extends away from main vertical support 14, front leg 16 increases in its distance from support surface 58 until it reaches its pedal extremity 17, which points straight down and touches support surface 58.

In use, barbecue assembly 10 is rested upon a support surface 58 as shown in FIG. 5. Objects may be placed beneath barbecue unit 20 along the sides of the centrally positioned front leg 16. Because there is only one front leg, the barbecue unit presents minimal interference to a user standing in front of the barbecue assembly 10 (viewing FIG. 5, the front of barbecue assembly 10 is to the right of the barbecue assembly 10). The user may easily approach the front of barbecue assembly 10, open hinged cover 24, and place food within barbecue unit 20 without bumping his or her feet or legs into barbecue assembly 10.

In order to reposition barbecue assembly 10, the user may remain in front of barbecue assembly 10 without having to walk around to the side or the back of the barbecue assembly. The user simply steps up to the front of barbecue assembly 10, takes hold of handle 26 and gently lifts handle 26 to cause the overall barbecue assembly 10 to tilt backward about a pivot axis defined by wheels 18a, 18b and support surface 58. This removes the contact between pedal extremity 17 and support surface 58, thereby eliminating the friction caused between pedal extremity 17 and support surface 58 and allows the barbecue assembly 10 to be easily wheeled to a new position.

Because of the weight distribution of the design of the illustrated embodiment, it is easy for the user to lift handle 26 in an upward direction to thereby cause pedal extremity 17 to be lifted off of support surface 58 and allow wheels 18a, 18b to move freely.

The illustrated barbecue assembly 10 is very stable in its construction and secure when in its upright position as shown in FIG. 5. This is because of the arrangement and positioning of barbecue stand 12 in relation to barbecue unit 20. Stand 12 is connected to barbecue unit 20 at a position that is offset toward the back of barbecue unit 20. More particularly, main vertical support 14 has a central longitudinal axis which intersects at its top end a lower side of barbecue unit 20 at a position spaced by a predetermined distance from a vertical center axis 50 of barbecue unit 20, toward the back side of barbecue unit 20. The central longitudinal axis 52 of main vertical support 14 intersects at its lower end a support surface 58 upon which barbecue assembly 10 is rested, at a position spaced more than the predetermined distance from vertical central axis 50 of barbecue unit 20 toward the back side of barbecue unit 20. This serves to prevent undesired or accidental tilting of barbecue assembly 10. In order to cause barbecue assembly 10 to tilt back about wheels 18a, 18b, a person must lift up on handle 26. If main vertical support 14 is closer to vertical center axis 50, the barbecue assembly 10 may be more susceptible to being accidentally tipped over, possibly causing injury to people around the cooking area.

In the illustrated embodiment, the barbecue stand comprises only three main pieces, including a front C-shaped member 46 and a pair of lateral C-shaped members 47a, 47b. The barbecue assembly is therefore easy to assemble. The three C-shaped members can be connected to each other by means of a single bracket 40 and a small number of bolts and/or screws. The barbecue assembly 10 of the present invention may be sold in the form of a kit including the necessary screws/bolts, or other appropriate connectors, and the various elements of the barbecue assembly 10 as disclosed herein.

While the invention has been described with reference to an example embodiment and certain aspects of that embodiment, it is understood that the words used herein are words of illustration, rather than words of limitation. Changes may be made, within the perview of the appended claims, without departing from the scope and the spirit of the invention in its various aspects. Although the invention has been described with reference to particular means, materials, and embodiments, the invention is not intended to be limited to the particulars herein. Rather, the invention extends to all equivalent structures, methods, and uses. For example, the barbecue assembly 10 may be provided with one or more functionally equivalent handles in addition to or instead of positioning handle 26. By way of example, a positioning handle could be provided which is attached directly to barbecue stand 12, or which is attached to side portions of barbecue unit basin 22. Further, the barbecue may be a "kettle" shape, rectangular in shape, or any other barbecue shape common to consumers.

I claim:

1. A barbecue unit with a forward end comprising:
   (a) a basin having a hinged cover, a grill, a front end and a rear end; and
   (b) a unitary post having a first end and a second end wherein:
      the first end is attached to the basin substantially near the rear end of the basin;
      a plurality of cantilever support arms is attached to the first end for supporting the basin; and
      the second end comprises at least three support legs attached thereto, wherein each support leg extends laterally from the second end of the unitary post.

2. The barbecue unit of claim 1 wherein the plurality of cantilever support arms comprises three cantilever support arms.

3. The barbecue unit of claim 2 wherein one cantilever support arm extends toward the front end of the basin, forming a front end-extending cantilever support arm.

4. The barbecue unit of claim 2 wherein two cantilever support arms extend in substantially opposite directions from the unitary post and form a substantially common axis that extends substantially perpendicular to the front end-extending cantilever support arm.

5. The barbecue unit of claim 1 wherein the unitary post comprises at least three members defined as a front member, a left member, and a right member, and each member has a support leg that is attached to the second end of the unitary post and extends laterally therefrom, and each member has a cantilever support arm attached to the first end for supporting the basin.

6. The barbecue unit of claim 5 wherein one support leg extends toward the forward end of the barbecue unit, forming a forward-extending support leg.

7. The barbecue unit of claim 6 wherein the support legs of the left and right members form a substantially common axis that extends laterally from the second end of the unitary post and substantially perpendicular to the forward-extending support leg.

8. The barbecue unit of claim 7 wherein the left and right support legs comprise an axle therebetween.

9. The barbecue unit of claim 1 wherein the at least three support legs each have a downward facing pedal extremity for contacting a support surface.

10. The barbecue unit of claim 1 wherein each support leg has a wheel attached thereto.

11. A barbecue unit with a forward end comprising:
  (a) a basin having a hinged cover, a grill, a front end and a rear end; and
  (b) a unitary post comprising a front member, a left member, and a right member wherein:
    the front, left and right members are in contact with each other; and
    each of the front, left and right members has a first end and a second end wherein:
      each first end is attached to the basin substantially near the rear end of the basin;
      each first end comprises a cantilever support arm attached thereto for supporting the basin; and
      each second end comprises a support leg attached thereto wherein each support leg extends laterally and downward from the unitary post to engage a support surface.

12. The barbecue unit of claim 11 wherein the cantilever support arm of the front member extends toward the front end of the basin.

13. The barbecue unit of claim 12 wherein the cantilever support arms of the left and right members form a substantially common axis that extends substantially perpendicular to the cantilever support arm of the front member.

14. The barbecue unit of claim 11 wherein each support leg has a wheel attached thereto.

15. The barbecue unit of claim 11 wherein the support leg of the front member extends toward the forward end of the barbecue unit.

16. The barbecue unit of claim 15 wherein the support legs of the left and right members form a substantially common axis that extends substantially perpendicular to the support leg of the front member.

17. The barbecue unit of claim 11 wherein the support legs of the left and right members each comprise a wheel.

18. The barbecue unit of claim 17 wherein the support legs of the left and right members each comprise an axle therebetween.

19. A barbecue unit with a forward end comprising:
  (a) a basin having a hinged cover, a grill, a front end and a rear end; and
  (b) a unitary post comprising a front member, a left member, and a right member wherein:
    the front, left and right members are in contact with each other; and
    each of the front, left and right members has a first end and a second end wherein:
      each first end is attached to the basin substantially near the rear end of the basin;
      each first end comprises a cantilever support arm attached thereto for supporting the basin wherein:
        the cantilever support arm of the front member extends toward the front end of the basin; and
        the cantilever support arms of the left and right members form a substantially common axis that extends substantially perpendicular to the cantilever support arm of the front member; and
      each second end comprises a support leg attached thereto wherein:
        each support leg extends laterally from the unitary post;
        the support legs of the left and right members form a common axis that extends substantially perpendicular to the support leg of the front member, and an axle extends between the left and right support legs;
        the left and right support legs each comprise a wheel; and
        the front support leg comprises a downward facing pedal extremity for contacting a support surface.

20. The barbecue unit of claim 19 wherein the front support leg comprises a wheel.

* * * * *